(12) United States Patent
Schroeder

(10) Patent No.: US 8,123,006 B1
(45) Date of Patent: Feb. 28, 2012

(54) LIGHTWEIGHT GAS SPRING DESIGN WITH VOLUME COMPENSATOR INCORPORATED INTO A SUSPENSION FORK FOR TWO WHEELED VEHICLES

(75) Inventor: Brady Matthew Schroeder, Simi Valley, CA (US)

(73) Assignee: Hayes Bicycle Group, Inc., Milwaukee, WI (US)

( * ) Notice: Subject to any disclaimer, the term of this patent is extended or adjusted under 35 U.S.C. 154(b) by 1293 days.

(21) Appl. No.: 11/787,151

(22) Filed: Apr. 13, 2007

(51) Int. Cl.
*F16F 9/48* (2006.01)

(52) U.S. Cl. .................... 188/286; 188/322.19; 280/276

(58) Field of Classification Search .................. 188/316, 188/317, 284, 286, 322.19; 267/64.11, 64.12, 267/64.13, 124, 64.28; 280/276
See application file for complete search history.

(56) References Cited

U.S. PATENT DOCUMENTS

| | | | |
|---|---|---|---|
| 2,934,332 A | 4/1960 | Mercier | |
| 3,070,363 A | 12/1962 | Ellis, Jr. | |
| 3,344,894 A | 10/1967 | Kenworthy | |
| 3,731,770 A | 5/1973 | Bindon | |
| 3,990,548 A | 11/1976 | Schupner | |
| 4,057,236 A | 11/1977 | Hennells | |
| 4,071,122 A | 1/1978 | Schupner | |
| 4,085,832 A | 4/1978 | Gaines | |
| 4,690,255 A | 9/1987 | Heideman | |
| 4,702,355 A | 10/1987 | Heideman | |
| 4,776,440 A * | 10/1988 | Yamada et al. ............... | 188/284 |
| 4,782,898 A | 11/1988 | Wellington et al. | |
| 5,050,712 A | 9/1991 | Heideman | |
| 5,450,933 A * | 9/1995 | Schuttler ..................... | 188/300 |
| 5,538,276 A | 7/1996 | Tullis | |
| 5,620,066 A * | 4/1997 | Schuttler ..................... | 188/300 |
| 5,720,369 A | 2/1998 | Thorn | |
| 5,775,677 A | 7/1998 | Englund | |
| 5,887,857 A * | 3/1999 | Perrin ........................ | 267/64.12 |
| 5,971,117 A * | 10/1999 | Grundei et al. ............... | 188/288 |
| 6,095,541 A | 8/2000 | Turner | |
| 6,105,988 A | 8/2000 | Turner | |
| 6,135,434 A | 10/2000 | Marking | |
| 6,234,461 B1 * | 5/2001 | Bohm et al. ............... | 267/64.12 |
| 6,296,092 B1 | 10/2001 | Marking | |
| 6,311,962 B1 | 11/2001 | Marking | |
| D457,300 S | 5/2002 | Kesinger | |

(Continued)

FOREIGN PATENT DOCUMENTS

DE         AT 172400 B   *  9/1952

(Continued)

*Primary Examiner* — Bradley King
*Assistant Examiner* — Stephen Bowes
(74) *Attorney, Agent, or Firm* — Thomas I. Rozsa

(57) ABSTRACT

A lightweight gas spring with a volume compensator, which is incorporated into a fork leg of a two-wheel vehicle fork. The fork leg includes a housing having an upper inner telescoping hollow rod with a closed top and bottom end which is partially inserted into a lower outer telescoping rod having a closed bottom end. The inner upper telescoping rod inside includes a stationary volume compensator, a reciprocating piston, a first expandable and contractible gas chamber between the volume compensator and the piston which functions as a positive gas spring, and a second expandable and contractible gas chamber between the piston and the bottom end which can function as a negative gas spring, an air bypass channel which is longitudinally positioned on the inner surface of the inner telescoping rod may open to the first and second gas chamber.

1 Claim, 6 Drawing Sheets

U.S. PATENT DOCUMENTS

| | | |
|---|---|---|
| 6,415,895 B2 | 7/2002 | Marking |
| 6,609,682 B2 | 8/2003 | Rogers |
| 6,938,887 B2 | 9/2005 | Achenbach |
| 6,981,578 B2 | 1/2006 | Leiphart et al. |
| 7,401,800 B2 * | 7/2008 | Jordan ................... 280/276 |
| 2003/0006539 A1 * | 1/2003 | Bertram et al. ............ 267/120 |
| 2003/0234144 A1 | 12/2003 | Fox |
| 2004/0145101 A1 | 7/2004 | Olds |
| 2005/0034944 A1 * | 2/2005 | Grundei ................... 188/316 |
| 2006/0016650 A1 * | 1/2006 | Kneip et al. ............ 188/322.19 |
| 2008/0041681 A1 * | 2/2008 | Shipman ................ 188/319.2 |

FOREIGN PATENT DOCUMENTS

| | | |
|---|---|---|
| DE | 3309042 A1 * | 9/1984 |
| DE | 10031975 A1 * | 1/2002 |
| EP | 1 063 446 | 6/2000 |
| FR | 2088644 A5 * | 4/1970 |
| GB | 1238508 A * | 8/1968 |
| JP | EP 0798485 A2 * | 3/1996 |
| JP | EP 0786607 A1 * | 7/1997 |
| WO | WO 01/01012 | 1/2001 |
| WO | WO01/01012 | 1/2001 |

* cited by examiner

LIGHTWEIGHT GAS SPRING DESIGN WITH VOLUME COMPENSATOR INCORPORATED INTO A SUSPENSION FORK FOR TWO WHEELED VEHICLES

BACKGROUND OF THE INVENTION

1. Field of the Invention

The present invention is related to a gas spring which is incorporated into a suspension fork for two wheel vehicles.

2. Description of the Prior Art

Gas springs are known art. The following 30 patents and published patent applications are the closest prior art references which are related to the present invention.

1. U.S. Pat. No. 3,070,363 issued to John T. Ellis, Jr. on Dec. 25, 1962 for "Shock Absorber" (hereafter the "Ellis Patent");

2. U.S. Pat. No. 3,344,894 issued to Grant F. Kenworthy on Oct. 3, 1967 for "Adjustable Hydraulic Shock Absorber" (hereafter the "Kenworthy Patent");

3. U.S. Pat. No. 3,731,770 issued to Glyn A. Bindon and assigned to Ace Controls, Inc. on May 8, 1973 for "Adjustable Shock Absorber" (hereafter the "Bindon Patent");

4. U.S. Pat. No. 3,990,548 issued to Willard J. Schupner and assigned to Efdyn Corporation on Nov. 9, 1976 for "Adjustable Hydraulic Dashpot" (hereafter the "548 Schupner Patent");

5. U.S. Pat. No. 4,057,236 issued to Ransom J. Hennells on Nov. 8, 1977 for "Energy Absorber" (hereafter the "Hennells Patent");

6. U.S. Pat. No. 4,071,122 issued to Willard J. Schupner and assigned to Efdyn Corporation on Jan. 31, 1978 for "Adjustable Shock Absorber" (hereafter the "122 Schupner Patent");

7. U.S. Pat. No. 4,085,832 issued to Donald Raymond Gaines et al. and assigned to Gulf & Western Manufacturing Company on Apr. 25, 1978 for "Multi-Chambered Foam Energy Absorber" (hereafter the "Gaines Patent");

8. U.S. Pat. No. 4,690,255 issued to Robert J. Heideman and assigned to Enertrols, Inc. on Sep. 1, 1987 for "Compact Shock Absorber" (hereafter the "255 Heideman Patent");

9. U.S. Pat. No. 4,702,355 issued to Robert J. Heideman and assigned to Enertrols, Inc. on Oct. 27, 1987 for "Shock Absorber With Hole-On-Groove Configuration And With Adjusting Device" (hereafter the "355 Heideman Patent");

10. U.S. Pat. No. 5,050,712 issued to Robert J. Heideman and assigned to Enertrols, Inc. on Sep. 24, 1991 for "Shock Absorber" (hereafter the "712 Heideman Patent");

11. U.S. Pat. No. 5,720,369 issued to Richard P. Thorn on Feb. 24, 1998 for "Adjustable, Lockable Devices" (hereafter the "Thorn Patent");

12. U.S. Design Pat. No. D457,300 issued to Donald Alan Kesinger on May 21, 2002 for "Shock Absorbing Post Assembly For Crutch And Bicycle Seat" (hereafter the "Kesinger Patent");

13. U.S. Pat. No. 6,609,682 issued to Burl A. Rogers on Aug. 26, 2003 for "Airplane Landing Gear Suspension And Shock-Absorbing Device" (hereafter the "Rogers Patent");

14. U.S. Pat. No. 6,981,578 issued to Troy Leiphart et al. on Jan. 3, 2006 for "Non-Pressurized Monotube Shock Absorber" (hereafter the "Leiphart Patent");

15. European Patent No. 00250189 issued to Franz-Josef Wolf and assigned to WOCO Industrietechnik GmbH on Dec. 27, 2000 for "Air Damper" (hereafter the "Wolf European Patent");

16. International Patent Application No. WO 01/01012 issued to Franz-Josef Wolf on Jan. 2, 2001 for "Air Shock Absorber" (hereafter the "Wolf International Patent Application");

17. U.S. Pat. No. 2,934,332 issued to Jean Mercier on Apr. 26, 1960 for "Shock Absorber" (hereafter the "Mercier Patent");

18. U.S. Pat. No. 4,782,898 issued to Scott L. Wellington et al. and assigned to Shell Oil Company on Nov. 8, 1988 for "Determining Residual Oil Saturation Using Carbon 14 Labeled Carbon Dioxide" (hereafter the "Wellington Patent");

19. U.S. Pat. No. 5,538,276 issued to Jay K. Tullis on Jul. 23, 1996 for "Tunable Air Spring" (hereafter the "Tullis Patent");

20. U.S. Pat. No. 5,775,677 issued to Arlo C. Englund on Jul. 7, 1998 for "Air Or Gas Sprung And Dampened Shock Absorber" (hereafter the "Englund Patent");

21. U.S. Pat. No. 6,095,541 issued to Paul H. Turner et al. and assigned to RockShox, Inc. on Aug. 1, 2000 for "Adjustable Gas Spring Suspension System" (hereafter the "541 Turner Patent");

22. U.S. Pat. No. 6,105,988 issued to Paul H. Turner et al. and assigned to RockShox, Inc. on Aug. 22, 2000 for "Adjustable Suspension System Having Positive And Negative Air Springs" (hereafter the "988 Turner Patent");

23. U.S. Pat. No. 6,135,434 issued to John Marking and assigned to Fox Factory, Inc. on Oct. 24, 2000 for "Shock Absorber With Positive And Negative Gas Spring Chambers" (hereafter the "434 Marking Patent");

24. U.S. Pat. No. 6,296,092 issued to John Marking et al. and assigned to Fox Factory, Inc. on Oct. 2, 2001 for "Position-Sensitive Shock Absorber" (hereafter the "092 Marking Patent");

25. U.S. Pat. No. 6,311,962 issued to John Marking and assigned to Fox Factory, Inc. on Nov. 6, 2001 for "Shock Absorber With External Air Cylinder Spring" (hereafter the "962 Marking Patent");

26. U.S. Pat. No. 6,415,895 issued to John Marking et al. and assigned to Fox Factory, Inc. on Jul. 9, 2002 for "Position-Sensitive Shock Absorber" (hereafter the "895 Marking Patent");

27. U.S. Pat. No. 6,609,682 issued to Burl A. Rogers on Aug. 26, 2003 for "Airplane Landing Gear Suspension And Shock-Absorbing Device" (hereafter the "Rogers Patent");

28. U.S. Published Patent Application No. 2003/0234144 issued to Robert C. Fox on Dec. 25, 2003 for "On-The-Fly Adjustable Air Spring" (hereafter the "Fox Published Patent Application");

29. U.S. Published Patent Application No. 2004/0145101 issued to Steven J. Olds on Jul. 29, 2004 for "Coil And Air Suspension System" (hereafter the "Olds Published Patent Application");

30. U.S. Pat. No. 6,938,887 issued to Martin Achenbach and assigned to DT Swiss Inc. on Sep. 6, 2005 for "Suspension System For Bicycles" (hereafter the "Achenbach Patent").

The Ellis Patent discloses a conventional shock absorber with a piston and hydraulic fluid contained therein. The innovation is that the space between the perforated tube and the casting is filled with a tubular filler which fills the entire space at low pressure. It is compressed when it is under high pressure.

The Kenworthy Patent discloses an adjustable hydraulic shock absorber. The innovation is the inclusion of a closed cell cellular rubber accumulator which is provided near the bottom of the hydraulic reservoir.

The Bindon Patent discloses an adjustable hydraulic shock absorber having a shock receiving piston means telescopingly mounted over an axially disposed fluid metering tube means.

The 548 Schupner Patent discloses an adjustable hydraulic dashpot, which includes a cellular material 104 which is fabricated out of rubber or a comparable material which is disposed in the chamber 40 between the pressure collar tube portion 48 and the front end of the metering sleeve 60.

The Hennells Patent is an energy absorber. This patent discloses an adjustable energy absorber including a housing having a ram slidably extending therefrom. A first control sleeve divides the housing into a pair of fluid chambers, which sleeve has an axially extending row of openings to provide communication between the two chambers.

The 122 Schupner Patent discloses an adjustable shock absorber, which discloses a pad of resilient cellular material which is located in a reservoir.

The Gaines Patent is a multi-chambered foam energy absorber, wherein the energy absorption is derived from a multiplicity of aligned foam plastic materials.

The 255 Heideman Patent is a compact shock absorber, which includes an inner tube 10, a piston assembly 12, an outer tube 14 and a bearing member 16. The patent discloses that as part of outer tube 14 an annular accumulator chamber 28 is positioned in which a split annular accumulator pad 30 is positioned.

The 355 Heideman Patent is a shock absorber. It includes that a pad 60 is formed of cellular rubber which may be filled with nitrogen to give it a high degree of resilience and includes a slot 62 providing clearance for the adjuster mechanism and metering orifices.

The 712 Heideman Patent discloses an accumulator pad 60 which substantially fills the entire volume 58 and is secured against rotation therein by means of retainer pins 144 which extend through the cellular rubber which may be filled with nitrogen provided with a high degree of resilience.

The Thorn Patent discloses an adjustable locking device which as shown in the Figures is used primarily as the base for a chair which can be moved up and down and absorbs shock as the person sits on the chair and moves it.

The Kesinger Patent is a design patent which is described as a shock absorber and post assembly for crutch and bicycle seats.

The Rogers Patent deals with an airplane landing gear suspension, which includes a shock absorber that uses polyurethane cylinders, discs or a combination of discs and cylinders.

The Leiphart Patent discloses a non-pressurized monotube shock absorber. It utilizes a mechanically fixed base valve to regulate oil flow between the compression and the compression compensation chambers, and a compressible bladder in the compensation chamber to allow compensation, which together eliminate the need for pressurized gas and a floating piston which is in most conventional monotube shock absorbers.

The Wolfe European Patent is in German. From the English abstract it discusses a pneumatic shock absorber especially for car engines which comprises two parallel plates connected by a flexible membrane with an enclosed pneumatic dampening and resonance shape and a bore and at least one plate being connected to the chamber.

The Wolfe International Patent Application discloses an air shock absorber which includes two damping plates which are made of foam material similar to the previously discussed Wolfe Patent.

The Mercer Patent discloses a shock absorber, including resilient means within the chamber of the shock absorber.

The Wellington Patent deals with a process for determining oil saturation using carbon 14 labeled carbon dioxide.

The Tullis Patent discloses a tunable air spring and shock absorber that comprises a cylinder, a piston rod extending out of the cylinder through a lower end thereof, and rod guide provided on the lower end of the cylinder for guiding the piston rod, a seal mounted on the rod guide and piston containing valving components to deliver desired force-velocity characteristics for rebound and compression mounted on the piston rod.

The Englund Patent is an air or gas sprung and dampened shock absorber. Specifically, Claim 1 reads as follows: "A gas sprung and pressure dampened shock absorber utilizing compressed gas for dampening comprising; a cylinder having a closed end and an open end forming a compression chamber; a shaft having a closed end and an open end; said open end of said shaft being reciprocally received within said cylinder through said open end of said cylinder for contracting and expanding said compression chamber during compression and rebound strokes of the shock absorber; a piston having a closed end and an open end; said open end of said shaft being reciprocally received within said cylinder through said open end of said cylinder for contracting and expanding said compression chamber during compression and rebound strokes of the shock absorber; a negative gas spring chamber formed between an outer surface of said shaft and said inner surface of said cylinder; said negative gas spring chamber expanding and contracting inversely relative to said compression chamber; wherein said negative gas spring chamber is adapted to communicate with at least said rebound chamber during only a portion of the compression and rebound strokes of the shock absorber and is closed relative to the atmosphere."

The 541 Turner Patent is an adjustable gas spring suspension system which has a negative pre-load gas adjustment system.

The 988 Turner Patent discloses an adjustable suspension system having positive and negative springs. However, the springs are either gas springs or air springs.

The 434 Marking Patent is a shock absorber with positive and negative gas spring chambers. It discloses damping cylinder 14 which preferably includes a floating piston 44. Floating piston 44 divides interior 21 of dampening cylinder 14 into a dampening fluid chamber 46, housing vented piston 32 and a gas chamber 48. Gas chamber 48 is sealable and is filled with a gas that acts as a spring, resisting compression by piston 44. Fluid chamber 46 is filled with a damping fluid, typically oil, thus damping the extension and collapse of the shock absorber.

The 092 Marking Patent is a position-sensitive shock absorber which talks about having a shock absorber. It also talks about having a damping means which includes a bypass channel for allowing the flow of fluid to go from one area to another. Claim 1 reads as follows: "A position-sensitive shock absorber comprising: a cylinder having an interior, first and second ends and defining an axis; a piston movably mounted within the cylinder for movement between the first and second ends; first and second bypass openings into the cylinder interior at first and second axially spaced-apart positions; a bypass channel fluidly coupling the first and second bypass openings; and a flow valve along the bypass channel permitting fluid flow from the first opening to the second opening and restricting fluid flow from the second opening to the first opening."

The 962 Marking Patent is a similar shock absorber to the above discussed Marking Patent which has similar relevant information.

The 895 Marking Patent is a divisional patent to the previously discussed 092 Marking Patent and has the same disclosures as discussed in that patent but has different claims.

The Fox Published Patent Application is an on-the-fly adjustable air spring. This discloses an air spring optionally integrated with a shock absorber or other damping unit, and has an air cylinder closed at one end, and in axially-slidable engagement with a sealing head at the other end.

The Olds Published Patent Application discloses a coil and air suspension system.

The Achnebach Patent talks about a suspension system for a bicycle. It relates to a spring damper system using fluid for bicycles having a first load applying segment, a second load applying segment, at least one spring mechanism, a damping means, and a regulating mechanism that automatically effects a damping behavior of a dampening means based on the tension or load present in at least one spring mechanism.

There is a significant need to provide a lightweight gas spring with an additional volume compensator to significantly improve the gas spring characteristics.

SUMMARY OF THE INVENTION

The present invention is a lightweight gas spring with a volume compensator, which is incorporated into a fork leg of a two-wheeled vehicle fork. The fork leg is comprised of a housing including an inner upper telescoping hollow rod and outer lower telescoping hollow rod, wherein the inner telescoping hollow rod is partially and movably inserted into the outer telescoping rod, and a piston connecting rod is positioned to connect to both inner upper and outer lower telescoping rods.

The inner telescoping hollow rod is comprised of an elongated circular wall having a top and bottom end which are air tightly sealed by the respective air top cap and air bottom cap, a volume control member which is connected to the bottom side of the air top cap, an elongated cylindrical volume compensator which is connected to the bottom of the volume control member, a reciprocating piston which is movably and air tightly positioned inside of the inner upper telescoping rod, a first expandable and contractible gas chamber which is positioned between the volume compensator and the piston and which serves as a positive air spring which is filled with pressured gas, and a second expandable and contractible gas chamber which is positioned between the piston and the air bottom cap, and is able to function as a negative air spring. An air bypass channel including a top end is longitudinally positioned on the inner surface of the inner telescoping rod, wherein the air bypass channel is connected between the first and second chamber according to a lower position of the reciprocating piston in a downward movement, which is lower than the top end of the air bypass channel.

The piston connecting hollow rod which is connected to the piston penetrates through the air bottom cap at the bottom end of the inner upper telescoping rod and extends to further air tightly connect to a bottom gas valve housing which is air tightly penetrated through the bottom end of the outer lower telescoping rod, wherein a gas valve switch is positioned so that pressured gases such as air is able to fill into the first and second gas chamber.

The first and second gas chambers are air tightly separated when the reciprocating piston has an upward movement to pass the air by pass channel in response to a dynamic load of a rider who is riding the two-wheel vehicle which has incorporated therein the present invention lightweight air spring with the volume compensator. The first gas chamber is compressed to be increasingly smaller by an upward movement of the piston, wherein the pressured gases inside of the first gas chamber acts as a positive gas spring which has an increasingly greater gas when compressed by the piston force, to thereby create a downward force which is applied to the top side of the piston to resist the continuous upward movement of the piston. The second gas chamber is expanded to be increasingly larger by the upward movement of the piston, wherein the pressured gases inside of the second gas chamber act as a negative gas spring which have an increasingly smaller gas pressure than when the chamber was initially filled with gas, to thereby create a downward force which is applied to the bottom side of the piston to resist the continuous upward movement of the piston. The piston stops the upward movement to reach a peak position when a dynamic load of the rider riding the vehicle is equal to the resistance force generated by the positive gas spring of the first gas chamber and the negative gas spring of the second gas chamber.

In accordance with the elasticity of the pressured gases and inertia of the gas spring movement, the piston has a downward movement after reaching the peak position, wherein the size of the first gas chamber is increasingly increased and the size of the second gas chamber is increasingly decreased. The pressured gases of the first gas chamber starts to flow into the second gas chamber through an air bypass channel when the piston moves down to below the top end of the air by pass channel. Correspondingly, the piston reaches a lowermost valley position which thereby completes a full cycle of the reciprocating movement.

With the aid of the air bypass channel and the volume compensator, the present invention gas spring presents superior air spring characteristics including smoother suspension characteristics and a greater bottom out force which provides a greater loading capacity as compared with the gas spring without the volume compensator. The volume compensator which is made of compressible plastic materials modifies the gas spring characteristics when it is compressed by the pressured gases. In addition, a volume control member contributes a faster process to fill in or release the pressured gases in the gas chambers since it occupies part of the inner volume of the inner upper telescoping rod to thereby provide a smaller volume for the first and second gas chamber, as compared with larger volumes of the gas chambers if the volume control member is absent.

It is an object of the present invention to provide is a lightweight gas spring with a volume compensator which is incorporated into a fork leg of a two-wheel vehicle fork, so that the fork leg will have superior gas spring characteristics including smoother suspension characteristics and a greater bottom out force which represents a greater loading capacity. The fork leg is comprised of a housing including an inner upper telescoping hollow rod and outer lower telescoping hollow rod, wherein the inner telescoping hollow rod is partially and movably inserted into the outer telescoping rod, and a piston connecting rod is positioned to be connected to both the inner upper and outer lower telescoping rod.

It is also an object of the present invention to provide a first expandable and contractible upper gas chamber which serves as a positive gas spring which is filled with pressured gas, and a second expandable and contractible lower gas chamber which functions as a negative gas spring. An air bypass channel including a top end is longitudinally positioned on the inner surface of the inner telescoping rod, so that fluid communication of the first upper and second lower gas chamber is achieved when the piston moves lower that the top end of the air bypass channel, and fluid communication is terminated when the piston moves higher than the top end of the air by pass channel.

It is an additional object of the present invention to provide the volume compensator which is made of compressible foam materials, wherein the volume compensator modifies the gas spring characteristics when it is compressed by the pressured gas in association with the interaction of the fluid communication and non-fluid communication of the first and second gas chamber with the aid of the air by pass channel, so that the present invention gas spring has a superior air spring characteristics including smoother suspension characteristics and greater bottom out force which represents a greater loading capacity.

It is a further object of the present invention to provide the volume control member, so that it contributes a faster process to fill in or release the pressured gas in the gas chambers since it occupies part of the inner volume of the inner upper telescoping rod. Therefore there are smaller volumes of the first and second gas chamber, as compared with larger volumes of the gas chamber if the volume control member is absent.

It is a further additional object of the present invention to provide a gas spring, so that any types of gas can be used to fill into the inner upper telescoping rod as long as the gas is non toxic, non chemically reactive and non flammable.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a lightweight gas spring with a volume compensator, which is incorporated into a fork leg of a two-wheeled vehicle fork. The fork leg is comprised of a housing including an upper inner telescoping hollow rod with a closed top and bottom end which is partially inserted into a lower outer telescoping rod having a closed bottom end. The inside of the inner upper telescoping rod is comprised of a stationary volume compensator, a reciprocating piston, a first expandable and contractible gas chamber between the volume compensator and a piston which functions as a positive gas spring, and a second expandable and contractible gas chamber between the piston and the bottom end which can function as a negative gas spring, an air bypass channel which is longitudinally positioned on the inner surface of the inner telescoping rod and which may open to the first and second gas chamber. A piston connecting hollow rod which is connected to the piston penetrates through the bottom end of the inner upper telescoping rod and extends to further penetrate through the bottom end of the outer lower telescoping rod, where a gas valve is positioned to control the pressurized gases which can be filled into the chambers of the inner telescoping rod.

Figure 1:
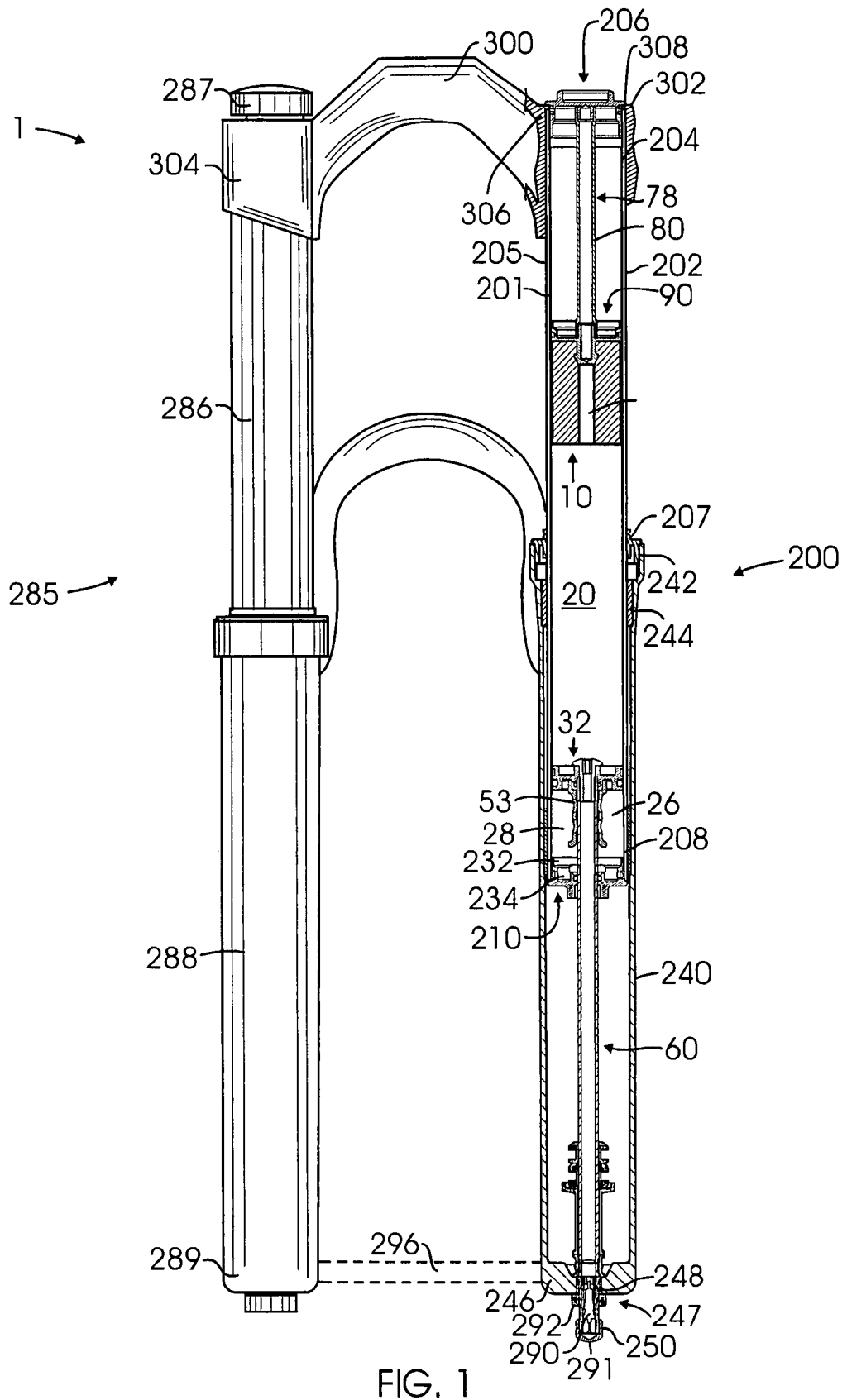
FIG. 1 is an elevational view in partial cross section of a vehicle fork which illustrates the structural components of a right fork leg which incorporates the present invention lightweight gas spring with a volume compensator.

Referring to FIG. 1, there is an illustrated vehicle fork 1, comprising a first fork leg 200, a crown 300 and a second fork leg 285, wherein the first fork leg 200 functions as a lightweight gas spring with a volume compensator of the present invention. It will be appreciated that FIG. 1 provides an overview of the primary structural components of the present invention first fork leg 200.

The first fork leg 200 is comprised of an inner upper telescoping rod 202 which contains air spring related structural components and an outer lower telescoping rod 240 having air spring related structural components. The inner upper telescoping rod 202, which matches the outer lower telescoping rod 240, is partially installed inside of the outer lower outer telescoping rod 240 so that the first fork leg 200 can freely move to expand or contract along the longitudinal direction of the fork leg 200.

As illustrated, the upper inner telescoping rod 202 is comprised of a elongated cylindrical wall having an outer circular surface 205, an inner circular surface 201, a top end 204 which is capped with an air top cap 206 and a bottom end 208 which is capped with an air bottom cap 210. The top cap 206 at an inner side is connected to a volume control member 78, wherein the volume control member is comprised of a round hollow shaft 80 which is connected to a stationary piston 90. The stationary piston 90 is further connected to a volume compensator 10. It will be appreciated that the volume compensator 10 is one of the primary structural components of the present invention.

Figure 3:
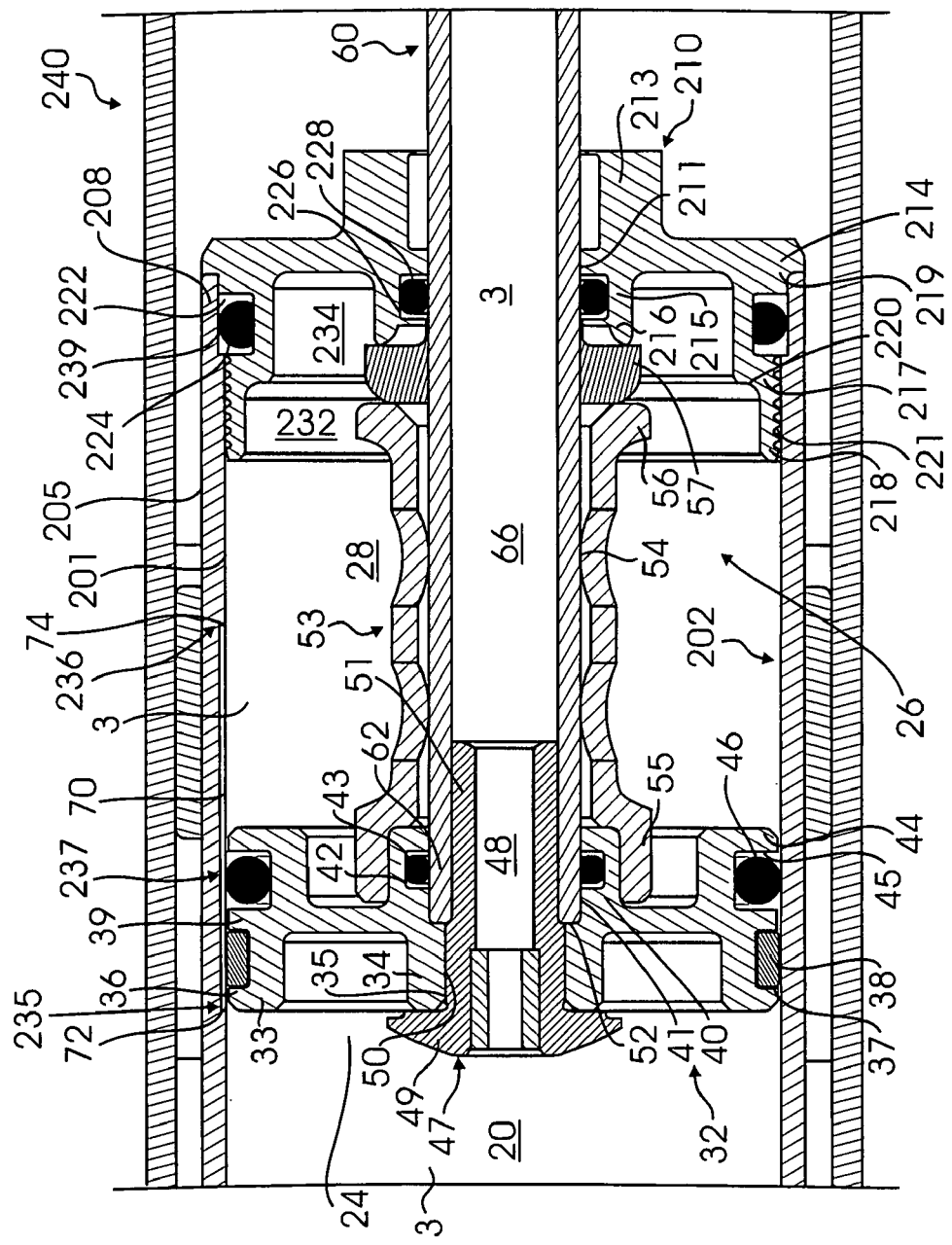
FIG. 3 is an elevational cross-sectional view which illustrates the structural components of the lower portion of the inner upper telescoping rod of the present invention gas spring, comprising a piston, an air bypass channel, an air bottom cap and an inner gas chamber between the piston and air bottom cap, which functions as a negative gas spring, wherein the air bypass channel is connected to the respective outer gas chamber which functions as the positive spring and the inner gas chamber which functions as the negative spring.

As further illustrated in FIG. 1, between a lower end of the volume compensator 10 and a top end of a reciprocating piston 32 which is air tightly and movably contacted to the inner surface 201 of the inner upper telescoping rod 202, there is an outer gas chamber 20 which is filled with pressured gas which functions as a positive gas spring. Similarly, between the piston 32 and the air bottom cap 210, there is an inner gas chamber 26, which can function as a negative gas spring if the pressure of the gas which is filled inside of the chamber 26 is less than the gas pressure in the chamber 20. The inner gas chamber 26 is combined with three sectional gas chambers 28, 232 and 234 which are connected to one another in series. It will be appreciated that, as best illustrated in FIG. 3, there is an elongated slot 70 which is longitudinally positioned on the inner surface 201 of the inner upper telescoping rod 202. The slot 70 can function as an air bypass channel if the reciprocating piston 32 is moved downwardly enough so that the slot 70 is connected between the outer gas chamber 20 and the inner gas chamber 26. It will be appreciated that the air bypass channel 70 is another primary structural component of the present invention.

The piston 32 is connected at its bottom side to a piston connecting rod 60, wherein the rod is extended to penetrate through the center of the air bottom cap 210. The connecting rod 60 is further downwardly extended to air tightly connect to a gas valve 247, comprising an adaptor 250 which functions as a gas valve housing. The gas valve housing 250 is air tightly inserted into a central bore 248 of a bottom end 246 of the outer lower telescoping hollow rod 240. With the aid of a gas valve switch 290 which is positioned inside of the gas valve housing 250, the pressured gases 3 can be filled into the inner and outer gas chambers 26 and 20 through the hollow piston connecting rod 60. The gas valve housing 250 is capped with an outer cap 291 and fastened with an exterior fastener 292, so that the air valve 247, which is comprised of the housing 250, switch 290, outer cap 291 and the exterior fastener 292, can be securely protected.

As additionally illustrated in FIG. 1, a spacer 53 is connected to a bottom end of the piston 32, and is positioned within the inner gas chamber 26, which spacer functions as a stopper to limit the maximum expansion of the first fork leg 200. In addition as illustrated, the lower outer telescoping hollow rod 240 at a top end 242 through a circular mechanical member 244 is slidably connected to the outer side 205 of the upper inner telescoping hollow rod 202. In addition, the first inner telescoping rod 202 at a middle position is affixed with an exterior annular member 207 which functions as the fork leg contracting stopper to limit a maximum contracting distance of the first fork leg 200, when the top end 242 of the outer lower telescoping rod 240 contacts the exterior annular member 207 of the inner upper telescoping rod 202 in the contracting movement of the first fork leg 200.

Figure 2:
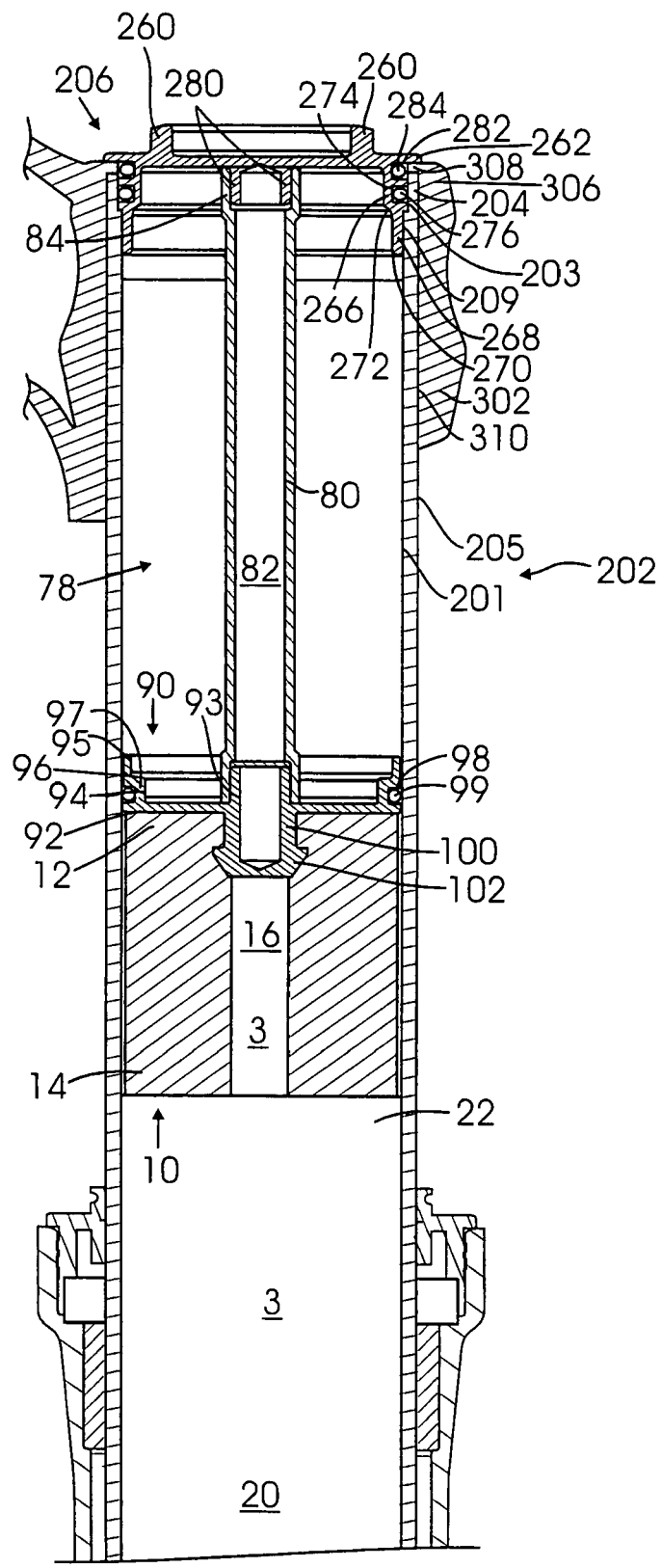
FIG. 2 is an elevational cross-sectional view which illustrates the structural components of the upper portion of an inner upper telescoping rod of the present invention gas spring, comprising an air top cap, a volume control member, a volume compensator and an outer gas chamber which functions as a positive gas spring.

Reference to FIG. 2 illustrates the detailed structural components of an upper portion of the inner telescoping rod 202, which includes the air top cap 206, the volume control member 78, and volume compensator 10.

The air top cap 206 which functions as a seal for the top end 204 of the upper inner telescoping rod 202 is comprised of a central transverse round flat member 262 having a circumference which is equal to the circumference of the outer circular surface 205 of the upper inner telescoping rod 202. A top upward annular wall 260 is concentrically positioned on the top side of the central transverse round member 262. The central transverse round flat member 262 at the bottom side is concentrically connected to an inner bottom downward cylindrical wall 280 and an outer bottom downward cylindrical wall having a shoulder-like outer surface. The outer bottom downward cylindrical wall is comprised of an upper circular section 266 which is connected to a lower circular section 268 having an annular bottom end 270, which also serves as the bottom end of the air top cap 206. The upper circular section 266 has a smaller inner diameter than the inner diameter of the lower circular section 268, so that there is an interior shelf 272 at the joint where the upper and lower circular sections 266 and 268 of the outer bottom downward cylindrical wall are concentrically connected. The upper circular section 266 has a downward outer surface, which contains a larger circumference as compared with a smaller circumference of a downward outer surface of the lower circular section 268 of the outer bottom downward cylindrical wall. As further illustrated, the height of the inner bottom cylindrical wall 280 is substantially less than the height of the outer bottom cylindrical wall.

Referring again to FIG. 2 there is ilustrated an upper transverse ring slot 282 with an annular opened end towards the outside of the inner upper rod 202, which is positioned at the joint where the upper circular section 266 of the outer bottom downward cylindrical wall is connected to the central transverse round flat member 262. In addition, a middle transverse ring slot 274 with an annular opened end towards the outside of the inner upper telescoping rod 202 is positioned on the outer surface of the upper circular section 266 of the outer bottom downward cylindrical wall adjacent the position of the interior shelf 272. It will be appreciated that the upper transverse ring slot 282 is used for housing an "O" ring 284, to thereby provide an air tight seal for the top end 204 of the upper inner telescoping rod 202 for the right end rod housing of the crown of the vehicle fork 1.

As further illustrated in FIG. 2, there is illustrated a top interior shoulder of the upper inner telescoping rod 202. The top interior shoulder is comprised of a top circular section 203 and a bottom circular section 209, wherein the top circular section 203 has a larger circumference as compared with a smaller circumference of the bottom circular section 209. The top interior shoulder is positioned at the top end 204 of the upper inner telescoping rod 202 to extend downwardly. It will be appreciated that the top interior shoulder having the top section 203 and bottom section 209 matches the outer bottom downward cylindrical wall having the respective upper circular section 266 and lower circular section 268 of the air top cap 206. Therefore, with the aid of an air tight sealing "O" ring 276 which is placed inside of the middle transverse ring slot 274, the air top cap 206 is air tightly sealed at the top end 204 of the upper inner telescoping rod 202.

Referring to FIG. 2, there is illustrated volume control member 78 comprising an elongated round hollow shaft 80 which is connected to a lower stationary piston 90. The elongated round hollow shaft 80 is comprised of an elongated circular wall having a central elongated round bore 82, an upper end 84 and a lower end 86. The upper end 84 of the shaft 80, which matches the inner bottom downward cylindrical wall 280, is concentrically and upwardly connected to the inner bottom cylindrical wall 280 of the air top cap 206.

The lower stationary piston 90 is comprised of a central transverse round flat member 92 having an outer circumference which matches the circumference of the inner circular surface 201 of the upper inner telescoping rod 202. The central transverse round flat member 92 at the top side is concentrically connected to an inner top upward cylindrical wall 93 and an outer top upward cylindrical wall having a straight outer surface. The outer top upward cylindrical wall is comprised of an upper circular section 94 having an annular top end 95 which is connected to a lower circular section 96.

The upper circular section 94 of the lower stationary piston 90 has a larger inner diameter than the inner diameter of the lower circular section 96. Therefore, there is an interior shelf 97 at the joint where the upper and lower circular sections 94 and 96 of the outer bottom cylindrical wall are concentrically connected. In addition, the height of the inner top upward cylindrical wall 93 is less than the height of the outer top upward cylindrical wall. As illustrated in FIG. 2, a lower transverse ring slot 98 with an annular opened end towards the outside of the inner upper rod 202 is positioned on the lower circular section 96 of the outer top upward cylindrical wall, wherein an "O" ring 99 is placed. It will be appreciated that the "O" ring 99 is used for an air tight seal of the stationary piston 90 to the inner surface 201 of the inner upper telescoping rod 202.

As further illustrated, the central transverse round flat member 92 at the bottom side is concentrically connected to a short height bottom downward shaft 100 having a closed end which contains a hook-like rim 102. It will be appreciated that the short height bottom downward shaft 100 having the hook-like rim end 102 is particularly designed to securely connect to the volume compensator 10 of the present invention.

The volume compensator 10 is an elongated cylinder, which is made of compressible porous plastic materials such as the polyurethane foam, having a top end 12, a bottom end 14 and a central elongated bore 16. As illustrated, the bottom of shaft 100 of the stationary piston 90 is inserted into the central bore 16 of the volume compensator 10, wherein the hook-like rim 102 of the bottom shaft 100 functions as an inner lock to securely hold the volume compensator 10, so that the top end 12 of the volume compensator 10 tightly contacts the bottom side of the central transverse round member 92 of the stationary piston 90.

Referring further to FIGS. 2 and 3, the bottom end 14 of the volume compensator 10 defines a top end 22 of the outer gas chamber 20, which functions as a positive gas spring if the chamber 20 is filled with pressured gases. The outer gas chamber 20 is illustrated to be aligned with the volume compensator 10, and extends to a movable bottom end 24, which contacts a top end 33 of the reciprocating piston 32, wherein the position of the top end 33 of the piston 32 defines the movable bottom end 24 of the outer gas chamber 20.

As illustrated in FIG. 3, the piston 32 is generally a cylindrical disc, which is comprised of a central transverse flat round member 39, having a central bore and an outer circumference, wherein the outer circumference of the piston central transverse flat round member 39 matches the circumference of the inner circular surface 201 of the upper inner telescoping rod 202. An inner top circular upward wall 34 is concentrically positioned on the central transverse flat round member 39 to surround an inner bore 35 of the wall 34. In addition, an outer top circular upward wall 36 which has the same wall height as the inner wall 34 is positioned on the central transverse flat round member 39, wherein the outer top circular upward wall 36 is further aligned with the outer circumference of the central round member 39. As illustrated, a transverse ring slot 37 is positioned on the outer top circular upward wall 36 and has an annular opened end of the slot 37 facing towards the outside of the inner upper telescoping rod 202. It will be appreciated that the ring slot 37 is used to house a piston ring 38 so that the piston 32 can have a smoothly reciprocating movement inside of the inner upper telescoping rod 202 along the longitudinal direction of the fork leg 200.

As further illustrated in FIG. 3, an inner bottom circular downward wall 40 is concentrically positioned on the bottom side of the central transverse flat round member 39 to surround an inner opening 41 of the wall 40. On an interior circular surface of the wall 40, there is an inner transverse ring slot 42, which has an annular opened end towards the inner opening 41. The slot 42 is used as a housing for an "O" ring 43, which is placed inside of the slot 42 to provide an air tight seal. In addition, an outer bottom circular downward wall 44, which has the same wall height as the inner downward wall 40, is also positioned on the bottom side of the central transverse flat round member 39 wherein the outer bottom circular downward wall 44 is further aligned with the outer circumference of the central transverse flat round member 39. Referring to FIG. 3 again, there is a transverse ring slot 45 with an annular opened end facing towards the outside of the inner upper telescoping rod 202, which is positioned on the outer bottom circular downward wall 44 for placing a guard gas sealing ring 46 which is placed inside of the slot 45. It will be appreciated that the guard air sealing ring 46 provides an air tight seal between the piston 32 and inner circular surface 201 of the inner upper telescoping rod 202.

In the above illustrated setting, the inner bore 35 of the inner top upward wall 34 is designed to be smaller than the inner bore 41 of the inner bottom downward wall 40 so that a shoulder 52 is formed at the joint where the inner bore 41 of the inner bottom downward wall 40 is concentrically connected to the inner bore 35 of the inner top upward wall 34. The inner bore 41 of the inner bottom downward wall 40 matches the size of the piston connecting rod 60, so that a top end 62 of the piston connecting hollow rod 60 is pressed into the inner bore 41 of the inner bottom downward wall 40 to contact the shoulder 52 of the piston 32. In this setting, the "O" ring 43 placed inside of the inner transverse ring slot 42 provides an air tight seal between the piston 32 and the piston connecting rod 60.

It will be appreciated that for the present invention, the inner bore 66 of the piston connecting rod 60 is designed to be smaller that the inner bore 35 of the inner top upward circular wall 34. Therefor a hollow threaded locking bolt 47 having a central opening 48 can be used to securely affix the piston 32 and the piston connecting rod 60. The hollow bolt 47 is comprised of a top head 49 connected to a neck 50, which is further connected to a male threaded end 51, wherein the neck 50 of the hollow bolt 47 matches the inner bore 35 of the inner top upward wall 34, and the male threaded end 51 of the bolt 47 matches the inner female threads of the inner bore 66 adjacent the top end 62 of the piston connecting rod 60.

As also illustrated in FIG. 3, a circular hollow spacer 53 is placed to connect to the piston 32 and surround the piston connecting rod 60. The hollow spacer 53 is comprised of a central opening 54, a top cylindrical end 55 to surround a central void and a bottom end 56. The top cylindrical end 55 of the spacer 53 is inwardly connected to the inner bottom downward wall 40 of the piston 32 which is placed inside of the central void of the spacer 53. The central opening 54 of the spacer 53 is penetrated by the piston connecting rod 60. It will be appreciated that the hollow spacer 53 functions as a stopper of the maximum expansion of the first fork leg 200, according to a downward movement when the outer lower telescoping rod 240 moves downwardly, or the inner upper telescoping rod 202 moves upwardly along the longitudinal direction of the first fork leg 200. When the first fork leg 200 is maximumly expanded, the bottom end 56 of the spacer 53 downwardly contacts a rubber bump 57 which is connected to the air bottom cap 210 of the inner upper telescoping rod 202, so that the expansion of the first fork leg 200 is stopped.

Referring to FIG. 3, there is illustrated that the piston rod 60 is extended downwardly to penetrate through a central bore 211 of the air bottom cap 210. The air bottom cap 210 is also generally cylindrical in shape, comprising a central transverse round flat member 214 having an outer circumference which is equal to the circumference of the outer circular surface 205 of the upper inner telescoping rod 202. A bottom annular downward wall 213, which surrounds the piston connecting rod 60, is concentrically positioned at the bottom side of the central transverse round member 214. The central transverse round flat member 214 at the top side is concentrically connected to an inner top upward cylindrical wall 215 having a top end 216, and an outer top upward cylindrical wall. The outer top annular cylindrical wall is comprised of a lower circular section 219, which is connected to an upper circular section 217 having an annular top end 218 which also serves as the top end of the air bottom cap 210. The upper circular section 217 has a larger inner diameter than the inner diameter of the lower circular section 219, so that there is an interior shelf 220 at the joint where the upper and lower circular sections 217 and 219 of the outer bottom cylindrical wall are concentrically connected.

The inner top upward cylindrical wall 215 at the inner side has a ring slot 226 with an opened circular end facing towards the central bore 211 of the bottom air cap 210, wherein an "O" ring 228 is placed inside of the ring slot 226 to provide an air tight seal for the air bottom cap 210 to the reciprocating piston connecting rod 60. As further illustrated in FIG. 3, the height of the inner top upward cylindrical wall 215 is substantially less than the height of the outer top upward cylindrical wall, wherein the inner top upward cylindrical wall 215 at the top end 216 is upwardly connected to the circular rubber bumper 57. Furthermore, the circular chamber 232, which is surrounded by the upper circular section 217 is concentrically connected to the circular chamber 234 which is positioned between the inner top upward cylindrical wall 215 and the lower section 219 of the outer top upward cylindrical wall. It will be appreciated that the circular chamber 232 and the circular chamber 234 which are connected in series are part of the inner gas chamber 26, which can function as the native gas spring of the present invention.

As further illustrated in FIG. 3, a male thread 221 is positioned on an outer surface of the upper circular section 217, which matches the female threads on the inner surface of the upper inner telescoping rod 202 adjacent the bottom end 208. A transverse ring slot 222 with an annular opened end facing towards the outside of the inner rod 202 is positioned on the outer surface of the lower circular section 219 of the outer circular upward cylindrical wall. The outer surface of the lower circular section 219 is illustrated to match an inner shoulder 239 from the bottom end 208 of the inner upper telescoping rod 202, and havng a larger circumference than the circumference of the outer surface of the upper circular section 217. As further illustrated in FIG. 3, an "O" ring 224 is placed inside of the ring slot 222 to provide an air tight seal between the bottom air cap 240 and the inner upper telescoping rod 202.

In the above illustrated design for the reciprocating piston 32 placed inside of the inner upper telescoping rod 202 and the air bottom cap 210 positioned at the bottom end 208 of the inner upper telescoping rod 202, it will be appreciated that the bottom side of the piston 32 and the top end 219 of the air bottom cap 210 defines the chamber 28 which is expandable and contractible with the reciprocating movement of the piston 32. Therefore, an accumulated inner gas chamber 26, which is combined with the expandable and contractible chamber 28 and the stationary chambers 232 and 234, is air tightly positioned inside of the inner upper telescoping rod 202 to be separated from the outer gas chamber 20, since the guard seal ring 46 of the piston 32 prevents the pressured gases in the outer gas chamber 20 from leaking into the inner gas chamber 26. The "O" ring 43 of the piston 32 and the "O" ring 228 of the bottom air cap 210 prevents the pressured gases in the inner bore 66 of the piston connecting rod 60 from leaking into the inner gas chamber 26. The "O" ring 224 of the bottom air cap 210 prevents the air inside of the outer lower telescoping rod 240 from leaking into the inner gas chamber 26. However, the isolated inner gas chamber 26 is enabled to conditionally connected to the outer gas chamber 20 through the presence of an air by pass channel 70, wherein the connection is contingent upon the position of the reciprocating piston 32. It will be appreciated that the air bypass channel 70 is another key structural feature of the present invention.

The air bypass channel 70 is illustrated in FIG. 3 to provide a pathway for a pressured gas 3 inside of the outer gas chamber 20 to flow into the inner gas chamber 26 according to a vertical position of the guard seal ring 46 of the piston 32. The air bypass channel 70 is generally an elongated narrow slot having a top end 72 and a bottom end 74, which is longitudinally positioned on the inner surface 201 of the inner upper telescoping rod 202 adjacent the bottom end 208 of the inner upper telescoping rod 202, wherein the top end 72 of the air bypass channel 70 is aligned with a position 235 of the inner surface 201 of the inner upper telescoping rod 202, and the bottom end 74 is aligned with a position 236 of the inner surface 201 of the inner upper telescoping rod 202.

In a situation as illustrated in FIG. 3, the piston 32 moves downwardly to the lowest position so that the bottom end 56 of the spacer 53 contacts the bumper 57 at the top of the bottom air cap 210. The guard seal ring 46 of the piston 32 is correspondingly moved down to a position 237, which is lower than the position 235 where the top end 72 of the air bypass channel 70 is positioned. In this setting, the guard seal ring 46 fails to seal the inner gas chamber 26, since the air bypass channel 70 links the outer gas chamber 20 and the inner gas chamber 26, which permits the pressured gases 3 of the chamber 20 to flow into the inner gas chamber 26.

Figure 4:
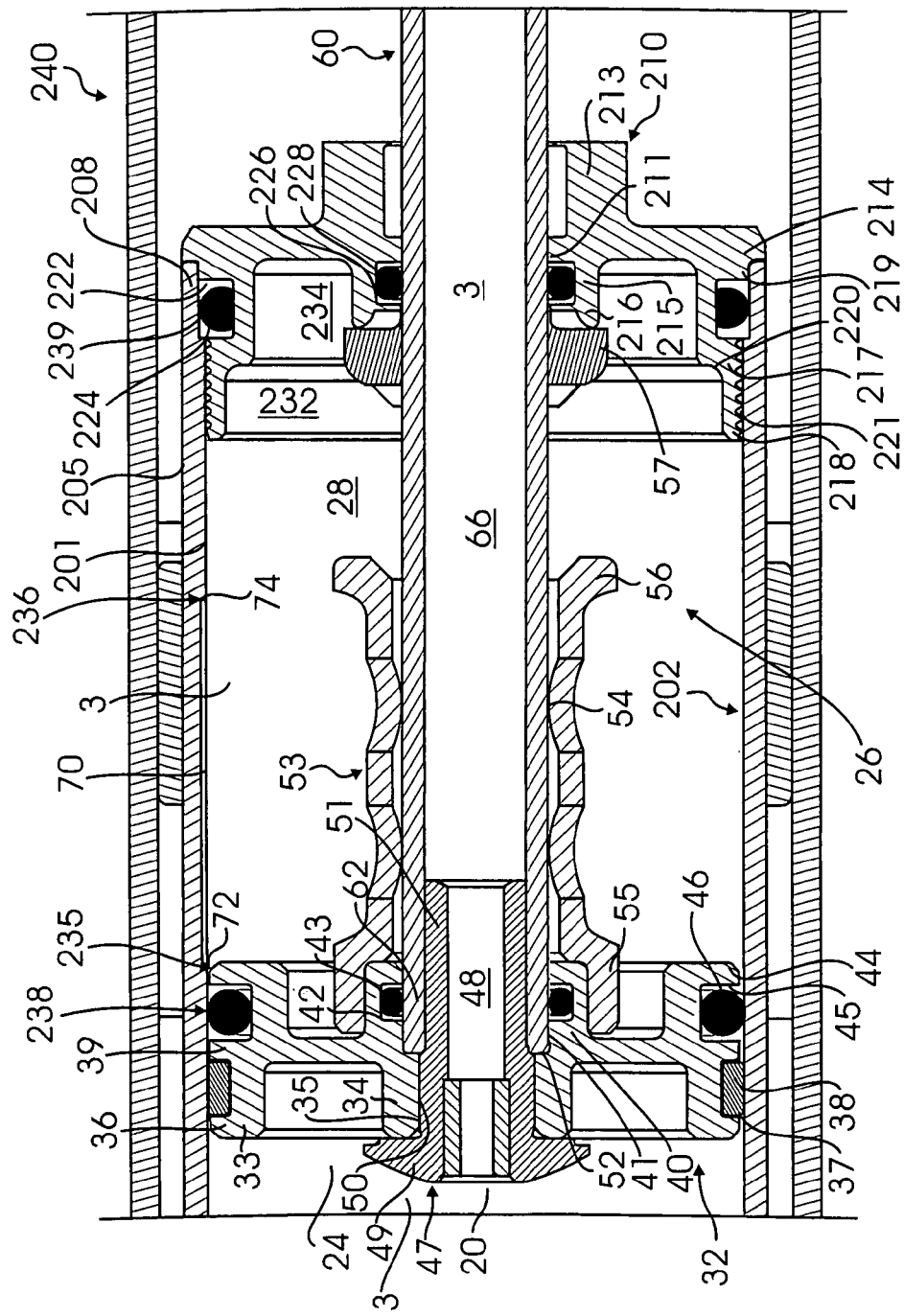
FIG. 4 is an elevational cross-sectional view which illustrates the structural components of the lower portion of the inner upper telescoping rod of the present invention gas spring, comprising the piston, air bypass channel, air bottom cap and inner gas chamber between the piston and air bottom cap which functions as a negative gas spring, wherein the air bypass channel is disconnected from the respective outer gas chamber which functions as the positive spring and the inner gas chamber which functions as the negative spring, as compared with the connection between the outer gas chamber and the inner gas chamber through the air bypass channel illustrated in FIG. 3.

In contrast to the situation illustrated in FIG. 3, FIG. 4 illustrates that the inner gas chamber 26 is isolated from the outer gas chamber 20, wherein the reciprocating piston 32 moves up during an upward movement. The guard seal ring 46 is correspondingly moved up to a position 238, which is higher than the position 235 where the top end 240 of the air bypass channel 70 is positioned. In this setting, the guard seal ring 46 has the air tight contact to the inner surface 201 of the inner upper telescoping rod 202 so that the inner gas chamber 26 is isolated from the outer gas chamber 20.

Figure 5:
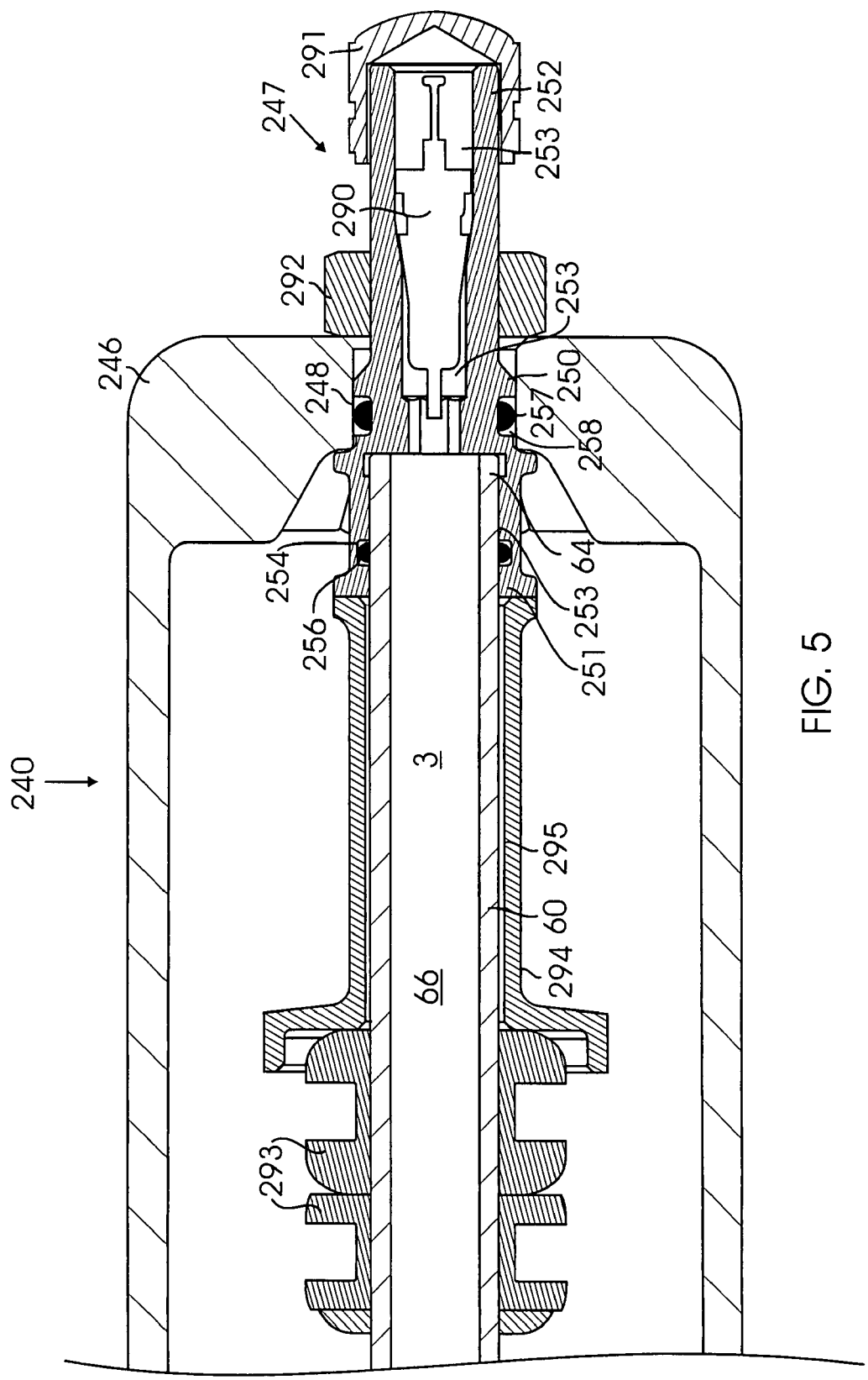
FIG. 5 is an elevational cross-sectional view to illustrate the structural features of the lower part of an outer lower telescoping rod of the present invention gas spring.

Referring to FIG. 5 there is illustrated the detailed structural components of the bottom part of the outer lower telescoping rod 240. As illustrated, the bottom end 64 of the piston connecting rod 60, after penetrating through centers of the multiple rubber bumpers 293 and a central bore 295 of a bottom support 294, is press-fitted into an upper part of an elongated bottom hollow adaptor 250 having a top end 251, a bottom end 252 and a central bore 253 with various internal diameters, wherein the bottom hollow adaptor 250 functions as a housing for the bottom gas valve 247. As illustrated, the adaptor 250 at the middle portion is concentrically affixed into a central bore 248 of the bottom end 246 of the outer lower telescoping rod 240. The adaptor 250 is also air tightly connected to the central bore 248 through an "O" ring 257 which is placed inside of a transverse ring slot 258 of the adaptor, wherein the ring slot 258 is positioned on an outer surface of the adaptor 250 to comprise a slot circular opened end which is towards the central bore 248 at the bottom of the outer lower telescoping rod 240.

The bottom adaptor 250 is further air tightly connected to the piston connecting rod 60, through an "O" ring 256 which is placed inside of a transverse ring slot 254. The ring slot 254 is positioned on the inner surface of the adaptor central bore 253 adjacent the top end 251 of the adaptor 250, wherein a circular opened end of the slot 254 faces towards the adaptor central bore 253. It will be appreciated that, with the aid of the air tight sealing "O" rings 256 and 257, the central bore 66 of the piston connecting rod 60 is air tightly connected to the central bore 253 of the adaptor 250 which extends to outside of the bottom end of the outer lower telescoping rod 240.

As further illustrated in FIG. 5, there is a gas valve switch 290, which is placed inside of the central bore 253 of the lower part of the adaptor 250. The gas valve switch 290 controls an on-off state of the central bore 253 of the adaptor 250, therefore, it also controls the pathway where the pressured gas 3 can be filled into or released from the inside of the inner upper telescoping rod 202. As illustrated, the bottom end 252 of the adaptor 250 is further capped by the bottom cap 291. In addition, an additional exterior fastener 292 such as a threaded nut which surrounds the adaptor 250 is used to securely affix the adaptor 250 to the bottom end 246 of the outer telescoping rod 240, wherein the exterior fastener 292 is positioned to contact the bottom end 246 of the outer lower telescoping rod 240. With the aid of the bottom cap 291 and the bottom fastener 292, the adaptor 250 is securely protected, which serves as a gas entrance of the first fork leg 200 for the pressured gases 3. It will be appreciated that although air is a preferred gas to be filled into the inner upper telescoping rod 202, any types of gases will be effective and are within the spirit and scope of the present invention as long as the gases are non flammable, non toxic and not chemically reactive.

Referring back to FIGS. 1 and 2, there is illustrated vehicle fork 1 after the first fork leg 200 of the present invention lightweight air spring with the volume compensator is installed. The vehicle fork 1 is comprised of a central crown 300 having a symmetrical right end rod housing 302 for the first fork leg 200, and left end rod housing 304 for the second fork leg 285. The right end rod housing 302 is further comprised of a top end 306 having a top transverse shaft 308, a bottom end 310 and a central bore 312 of the housing.

In installation of the first fork leg 200, the air top cap 206 is installed after affixation of the top portion of the inner upper telescoping rod 202 of the first fork leg 200 into the right end rod housing 302 of the fork crown 300. As best illustrated in FIG. 2, the transverse flat shaft 308 at the top end 306 of the right end rod housing 302 has a round opening, which has the same diameter as the diameter of the circular top 203 of the top inner shoulder of the inner upper telescoping rod 202, and is concentric with the inner bore 310 of the housing 302. The inner bore 310, which at the top is connected to the top transverse flat shaft 308, has the same diameter as the diameter of the outer circular surface 205 of the inner upper telescoping rod 202 and is aligned with the longitudinal orientation of the housing 302. Therefore during the installation, the inner upper telescoping rod 202 at the top end 204 is inserted into the inner bore 310 of the right end housing 202 to contact the top transverse shaft 308. In installation of the air top cap 206 which is pre-connected to the volume control member 78 which is further connected to the volume compensator 10, the lower circular section 268 including the bottom end 270 of the air top cap 206 is inserted into the lower section 209 of the top shoulder of the inner upper telescoping rod 202. Similarly, the upper circular section 266 is affixed into the upper circular section 203 of the top inner shoulder. In this setting, the top "O" ring 284 provides the air tight seal between the rod housing 302 and the top end 204 of the inner upper telescoping rod 202, and the middle "O" ring 276 provides the air tight seal between the air top cover 206 and the inner upper telescoping rod 202.

The second fork leg 285 which is illustrated in FIG. 1 is a conventional fork leg, comprising internal mechanical springs which are not shown, an inner upper telescoping rod 286 having a top end 287, and an outer lower telescoping rod 288 having a bottom end 289. The inner upper telescoping rod 286 is partially inserted into the outer lower telescoping rod 288. In addition, the top end 287 of the inner upper telescoping rod 286 is affixed into the left end rod housing 304 of the crown 300. It will be appreciated that a wheel axle 296 can be affixed to the respective bottom ends 246 and 288 of the respective first and second fork legs 200 and 285, so that a front wheel can be positioned.

Referring to FIGS. 1-6, there is illustrated application of the present invention lightweight air spring with volume compensator after assembling the vehicle fork including the first fork leg 200, and filling the pressured gas 3 such as air with a pressure ranging from 40 psi to 100 psi into the inside of the inner upper telescoping rod 202, wherein the pressured gas 3 mainly occupies the volumes of the central bore 16 of the volume compensator 10, the outer gas chamber 20, the inner gas chamber 26 and the central bore 66 of the piston connecting rod 60. It will be appreciated that after filling the pressured gas 3, the first fork leg 200 is at the maximumly expanded condition which is illustrated in FIG. 3, before the rider begins to ride the vehicle having the vehicle fork 1. In that setting, the piston 32 is downwardly pressed by the pressured gas 3 to the lowest position since the spacer 53 stops the further downward movement of the piston 32 thereby stopping fork leg expansion, wherein the spacer 53 at the bottom end 56 contacts the bumper 57 of the air bottom cap 210. It will be further appreciated that a specific pressure of the filled gases is determined in accordance with a weight of the rider and vehicle riding conditions such as the riding area condition.

It will be appreciated that the volume of the pressured gas 3 inside of the inner upper telescoping rod 202 starts to be compressed after the rider begins to ride on the vehicle since the body weight of the rider is applied to the inside pressurized gas 3 through the contracting movement of the first fork leg 200, wherein the inner and outer telescoping rods 202 and 240 move towards each other. For an illustration purpose, the position of the bottom end 208 of the inner telescoping rod 202 is used as a reference for the expanding and contracting movement of the first fork leg 200 including the reciprocating movement of the piston 32 which is placed inside of the first fork leg 200. In general, the upward movement of the piston 32, which corresponds to a contracting movement of the first fork leg 200, reduces the volume of the outer gas chamber 20 and increases the volume of the inner gas chamber 26, Oppositely, the downward movement of the piston 32, which corresponds to an expanding movement of the first fork leg 200, increases the volume of the outer gas chamber 20 and reduces the volume of the inner gas chamber 26. It will be appreciated that the pressures of the gases in the respective outer and inner chambers 20 and 26 will be respectively changed according to the respective downward and upward movement of the reciprocating piston 32.

Referring to FIG. 3, there is illustrated that the pressures of the gas 3 in the outer chamber 20 and the inner chamber 26 are the same since the air bypass channel 70 is connected to both chambers. As illustrated previously, FIG. 3 also illustrates that the piston 32 is moved to the lowest position during its reciprocating movement. It will be appreciated that, after the rider rides on the vehicle which contracts the first fork leg 200, the piston 32 starts to have an upward movement. As illustrated in FIG. 4, at a moment during the upward movement, the piston 32 moves up to a position which brings the guard seal ring 46 to a position 238 which is just above the position 235 where the top end 72 of the air bypass channel 70 is positioned. In that position, the gas flow is just stopped from the outer gas chamber 20 to the inner gas chamber 26 due to the air tight seal of the guard seal ring 46 which air tightly seals both the outer and inner gas chamber 20 and 26. In addition, it will be further appreciated that the gas pressure inside of the inner gas chamber 26 is equal to the gas pressure inside of the outer gas chamber 20, which is higher than the pressure of the gas 3 which is just filled.

Following the illustration in FIGS. 3 and 4, it will be appreciated that the piston 32 continues to move up, therefore, the volume of the outer gas chamber 20 is continuously reduced so that the inside gas pressure is correspondingly increased, which is more positive than the positive pressure of the gas 3 which is initially filled in. In contrast, the volume of the inner gas chamber 26 is simultaneously increased so that inside gas pressure is decreased, which is relatively negative as compared with the positive pressure of the gas 3 which is initially filled in.

The gas pressure inside of the inner gas chamber 26 is increasingly smaller than the pressure inside of the outer gas chamber 20 according to the continuous upward movement of the piston 32. Therefore, the gas in the outer gas chamber 20 function as a positive air spring, as compared with the gas in the inner gas chamber 26 which function as a negative air spring since the pressure of the gas in the gas chamber 26 is less than the gas pressure of the outer gas chamber 20. Therefore the positive air spring 20 will have a downward pressing force which is applied to the top end 33 of the piston 32 to provide resistance to the piston 32 further upward movement. In the meantime, the negative spring 26 will also have a downward pulling force which is applied to the bottom side of the piston 32 to also provide resistance to the piston 32 further upward movement. Therefore, it will be appreciated, that a movement that provides a combined force which is combined with the pressing force of the positive gas spring 20 and pulling force of the negative gas spring 26 is equal to a dynamic load including the body weight of the rider and a bumping condition of the riding which are applied to the gas inside of the inner upper telescoping rod 202 to force the piston 32 having an upward movement. The piston 32 will stop the upward movement at a position which is a peak position of the piston upward movement, relative to the position of the top end 219 of the air bottom cap 210. In an alternative explanation, the piston peak position is reached when the downward force, which is applied on the top end 33 of the piston 32 from a positive pressure difference of the outer chamber 20 as compared with the pressure of the inner chamber 26, is equal to an upward force which is applied to the piston from the dynamic load of the rider.

It will be appreciated that due to reasons including that the pressured gas is elastic and that inertia is a fundamental role to govern the mechanical movement, the piston 34 will be moved down after it reaches the peak position. In the downward movement of the piston 32, after the guard seal ring 46 is positioned to be just below the position 235 where top end 72 of the air bypass channel 70 is located, the air bypass channel 70 starts to connect between the positive gas spring 20 and the negative gas spring 26 where the higher pressured gas flows from the outer gas chamber 20 to the inner gas chamber 26 having the lower pressured gas so that the pressure inside of the inner telescoping rod 202 is equalized. At this point the downward movement of the piston 32 is stopped, wherein the piston 32 completes a full cycle of the reciprocating movement, and is ready to repeat another full cycle of the reciprocating movement as illustrated above.

It will be appreciated that the above illustrated piston reciprocating movement and positive and negative air spring transformation and cancellation will be repeatedly happen when the rider is riding on the vehicle. For best utilizing the above illustrated characteristics of the gas spring movement, the present invention sets an initial position of the guard seal ring 43 which is lower than but adjacent the position 235 where the top end 72 of the air bypass channel 70 is positioned, through controlling the length of the spacer 53 and the initial pressure of the filled gas 3 according to the body weight of the rider and riding conditions. Therefore, the present invention makes transformation of the positive and negative gas spring and cancellation of the positive and negative gas spring sensitive, so that the present invention of the lightweight gas spring with the volume compensator achieves more elastic spring characteristics in comparison with a relative rigid spring characteristics from the prior art air spring without the air by pass channel.

It will be further appreciated that in addition to the air bypass channel 70, the volume compensator 10 is another key structural feature of the present invention to achieve optimum gas spring characteristics. The volume compensator 10 is elastically compressible having a threshold value of the compressibility. The total volume as determined by the top end 12 and the bottom end 14 of the cylindrical body will be reduced when it is under the force of the pressured gas. Meanwhile the volume compensator 10 with the reduced volume has a greater force to resist a further volume reduction so that it modifies the characteristics of the compressed gases. Therefore, the volume compensator improves the spring characteristics of the pressured gas.

Figure 6:
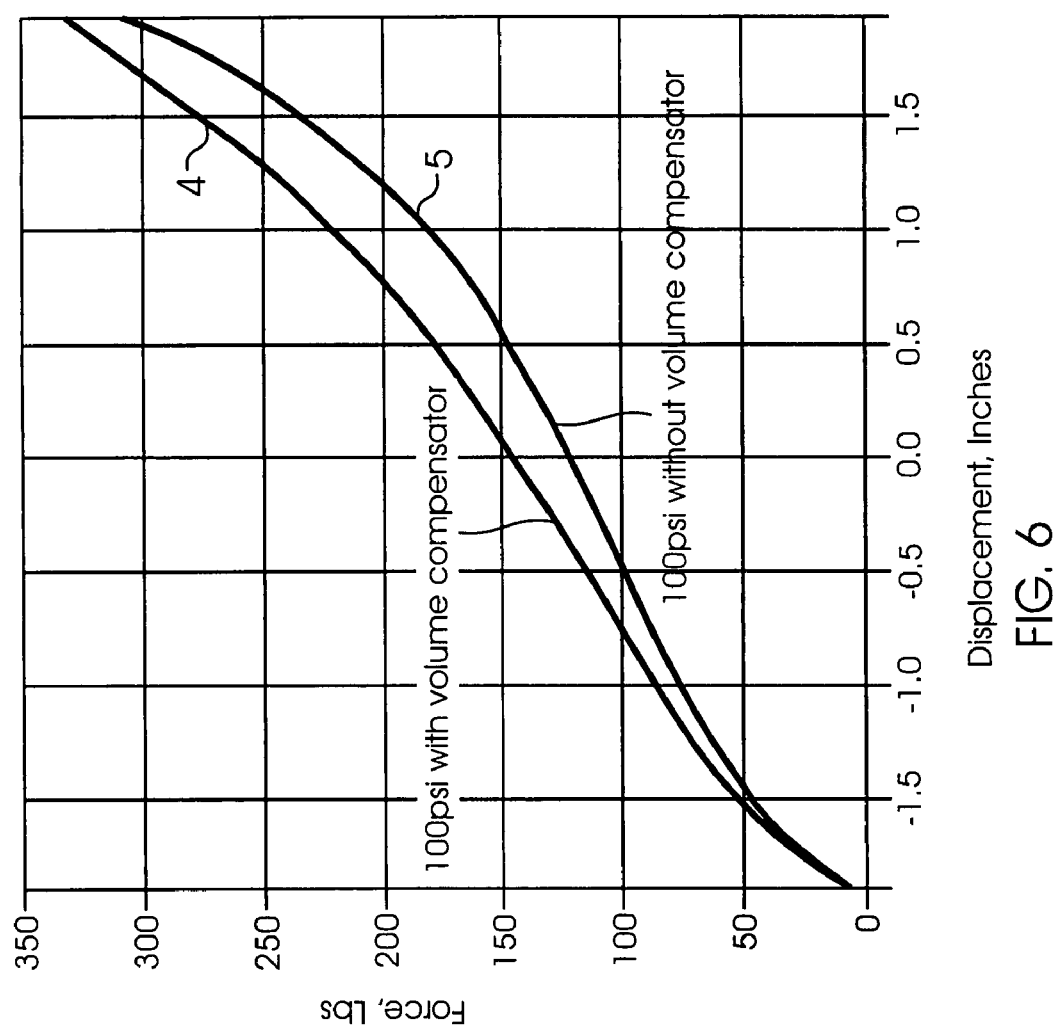
FIG. 6 is a graph containing curves which compare the spring characteristics of the air springs with and without the volume compensator, wherein air functions as the spring gas.

With a combination of the presence of the air bypass channel and the volume compensator, the present invention lightweight air spring with the volume compensator achieves a superior performance in terms of the active gas spring characteristics including a bottom out force relative to a spring displaced distance of the piston 32 which are illustrated through the graph in FIG. 6. FIG. 6 introduces a top curve 4 of an air spring bottom out force vs. the displacement of the piston, which is generated in the combination of the presence of the volume compensator 10 and air bypass channel 70 wherein an initial pressure 100 psi is used to fill into the inner upper telescoping rod 202, and a bottom curve 5 which is from the same air spring with the gases having the same initial pressure 100 psi but without the volume compensator 10. In comparison with the bottom curve 5, the top curve 4 shows a more linear characteristics of the curve initial portion, which demonstrates a more smooth suspension characteristics of the air spring. The top curve 4 further shows a greater bottom out force at every spring displacement of the air spring, which demonstrates a greater loading capacity of the air spring of the present invention.

It will be appreciated that the volume control member 78 is also advantageous to the present invention lightweight air spring. The volume control member 78 occupies part of the inner volumes of the inner upper telescoping rod 202 so that less volume of the pressured gases 3 is needed to fill the inside of the inner upper telescoping rod 202, which speeds up the gas spring installation process. However, the volume control member 78 can be eliminated to simplify the structure of the present invention lightweight gas spring with the volume compensator.

In a preferred embodiment, the air bypass channel 70 is illustrated to be the elongated slot which is positioned aligned with the longitudinal direction of the first fork leg 200. However, the air bypass channel can also be curved in a spiral shape so long as the curved spiral is in not like a part of the circumference which is positioned horizontally in the inner surface 201 of the inner upper telescoping rod 202.

In the above disclosures for the present invention, the light weigh gas spring with the volume compensator is illustrated to be a preferred elongated round structure. However, it is within the spirit and scope of the present invention for the lightweight gas spring to not be limited to be in the round shape of the transverse cross section. In fact, any non round shaped transverse cross section is appropriate for the gas spring of the present invention.

Defined in detail, the present invention is a suspension fork for a two wheeled vehicle having a fork leg comprising: (a) a gas spring housing which includes an inner telescoping hollow rod and outer telescoping hollow rod, wherein the inner telescoping hollow rod is partially and movably inserted into the outer telescoping rod, the inner telescoping hollow rod includes an elongated circular wall having a top end which is air tightly sealed by an air top cap and a bottom end which is air tightly sealed by an air bottom cap, the outer telescoping hollow rod includes an elongated circular wall having a top end which is slidably connected to the inner telescoping rod and a bottom end with a central bore; (b) a volume control member which is placed inside of the inner upper telescoping rod and is connected to the air top cap and having an elongated hollow shaft which is connected to a lower stationary piston which is air tightly affixed to the inside of the inner upper telescoping rod; (c) an elastic volume compensator which is connected to the stationary piston of the volume control member, comprising an elongated cylinder having a top end and bottom end; (d) a reciprocating piston including a top end, bottom end and circular side wall, wherein the piston is movably and air tightly contacted to the inner side of the inner upper telescoping rod; (e) a first expandable and contractible chamber filled with a gas and which is positioned between the volume compensator and the reciprocating piston, comprising a stationary chamber end and a changeable chamber end which is connected to the piston, wherein the changeable chamber end is changed along with the reciprocating movement of the piston; (f) a second expandable and contractible chamber filled with a gas and which is positioned between the reciprocating piston and the bottom end of the inner upper telescoping rod, comprising a stationary chamber end and a changeable chamber end which is connected to the piston, wherein the changeable chamber end is changed along with the reciprocating movement of the piston; (g) an air bypass channel, comprising an elongated slot which is longitudinally positioned on the inner surface of the inner upper telescoping rod, the air bypass channel is connected between the first and second expandable and contractible chambers only when the second expandable and contractible is in a contracting process, and the air bypass channel is disconnected between the first and second expandable and contractible chamber only when the first expandable and contractible is in a contracting process; (h) a piston connecting hollow rod connected to the piston, which extends to penetrate through the air bottom cap and connect to the central bore at the bottom end of the outer lower telescoping rod; and (i) a gas valve, which is installed at the bottom end of the outer lower telescoping rod to connect to the piston connecting rod.

Defined more broadly, the present invention is a suspension fork for a two wheeled vehicle having a fork leg comprising: (a) gas spring housing which includes an inner telescoping hollow rod and an outer telescoping hollow rod, wherein the inner telescoping hollow rod is partially and movably inserted into the outer telescoping rod, the inner telescoping hollow rod includes an air tightly sealed top end, an air tightly sealed bottom end, the outer telescoping hollow rod includes a top end which is slidably connected to the inner telescoping rod and a bottom end with a central bore; (b) a volume control member which is placed inside of the inner upper telescoping rod and is connected to the top rod end including a stationary piston which is air tightly contacted to inside of the inner upper telescoping rod; (c) an elastic volume compensator which is connected to the stationary piston of the volume control member and having a top end and a bottom end; (d) a reciprocating piston having a circular side wall, wherein the piston is movably and air tightly contacted to the inner side of the inner upper telescoping rod; (e) a first expandable and contractible chamber having gas therein and which is positioned between the volume compensator and the reciprocating piston and including a stationary chamber end and a changeable chamber end which is connected to the piston; (f) a second expandable and contractible chamber having gas therein and which is positioned between the reciprocating piston and the bottom end of the inner upper telescoping rod and including a stationary chamber end and a changeable chamber end which is connected to the piston; (g) an air bypass channel having an elongated slot which is longitudinally positioned on the inner surface of the inner upper telescoping rod and configured so that the air bypass channel is connected between the first and second expandable and contractible chamber only when the second expandable and contractible chamber is in a contracting process and configured so that the air bypass channel is disconnected between the first and second expandable and contractible chamber only when the first expandable and contractible chamber is in a contracting process; (h) a piston connecting hollow rod connected to the piston which extends to penetrate through the bottom end of the inner telescoping rod and connect to the central bore at the bottom end of the outer lower telescoping rod; and (i) a gas valve, which is installed at the bottom end of the outer lower telescoping rod to connect to the piston connecting rod.

Defined even more broadly, the present invention is a suspension fork for a two wheeled vehicle having a fork leg comprising: (a) a gas spring housing including an upper section and a lower section, wherein they are movably mated together, the upper section including an air tightly sealed top end and an air tightly sealed bottom end, the lower section including a bottom end with a central bore; (b) an elastic volume compensator which is positioned inside of the upper section and is connected to the top of the upper section; (c) a reciprocating piston comprising a circular side wall, wherein the piston is movably and air tightly contacted to the upper section of the housing; (d) a first expandable and contractible chamber having gas therein and which is positioned between the volume compensator and the reciprocating piston, and having a changeable chamber end which is in contact with the piston; (e) a second expandable and contractible chamber having gas therein and which is positioned between the reciprocating piston and the bottom end of the upper section of the housing, and having a changeable chamber end which is connected to the piston; (f) an air bypass channel having a slot which is positioned on the inner surface of the upper section of the housing, the air bypass channel is connected between the first and second expandable and contractible chambers only when the second expandable and contractible is in a contracting process, and the air bypass channel is disconnected between the first and second expandable and contractible chamber only when the first expandable and contractible chamber is in a contracting process; (g) a piston connecting hollow rod connected to the piston, which extends to penetrate through the bottom end of the upper section of the housing and connect to the central bore of the bottom section of the housing; and (h) a gas valve which is installed at the bottom of the bottom section to connect to the piston connecting rod.

Defined even more broadly, the present invention is a suspension fork having a fork leg comprising: (a) a gas spring housing including an upper section and a lower section, wherein they are movably mated together, the upper section including an air tightly sealed top end and an air tightly sealed bottom end, the lower section including a bottom end with a central bore; (b) an elastic volume compensator which is positioned inside of the upper section and is in contact with an interior of the top of the upper section; (c) a reciprocating piston comprising a circular side wall, wherein the piston is movably and air tightly contacted to the upper section of the housing; (d) a first expandable and contractible chamber having gas therein and which is positioned between the volume compensator and the reciprocating piston, and having a changeable chamber end which is in contact with the piston; (e) a second expandable and contractible chamber having gas therein and which is positioned between the reciprocating piston and the bottom end of the upper section of the housing, and having a changeable chamber end which is contact with the piston; and (f) an air bypass channel connected between the first and second expandable and contractible chambers and configured to permit fluid communication between the two chambers during a portion of the piston's movement and which prevents fluid communication between the two chambers after the piston has moved by a given distance.

Defined even more broadly, the present invention is a suspension fork having a fork leg comprising: (a) a gas spring housing including an upper section and a lower section, wherein they are movably mated together, the upper section a sealed top end and sealed bottom end, the lower section including a bottom end with a central bore; (b) an elastic volume compensator which is positioned inside of the upper section and is in contact with an interior of the top of the upper section; (c) a reciprocating piston movably positioned within the upper section of the housing; (d) a first expandable and contractible chamber having gas therein and which is positioned between the volume compensator and the reciprocating piston, and having a changeable chamber end which is in contact with the piston; (e) a second expandable and contractible chamber having gas therein and which is positioned between the reciprocating piston and the bottom end of the upper section of the housing, and having a changeable chamber end which is contact with the piston; and (f) an air bypass channel connected between the first and second expandable and contractible chambers only when the second expandable and contractible is in a contracting process, and the air bypass channel is disconnected between the first and second expandable and contractible chamber only when the first expandable and contractible chamber is in a contracting process.

Defined most broadly, the present invention is a suspension fork having a fork leg comprising: (a) a gas spring housing including an upper section and a lower section, wherein they are movably mated together, the upper section a sealed top end and sealed bottom end, the lower section including a bottom end with a central bore; (b) an elastic volume compensator which is positioned inside of the upper section and is in contact with an interior of the top of the upper section; (c) a reciprocating piston movably positioned within the upper section of the housing; (d) a first expandable and contractible chamber having gas therein and which is positioned between the volume compensator and the reciprocating piston, and having a changeable chamber end which is in contact with the piston; (e) a second expandable and contractible chamber having gas therein and which is positioned between the reciprocating piston and the bottom end of the upper section of the housing, and having a changeable chamber end which is contact with the piston; and (f) an air bypass channel connected between the first and second expandable and contractible chambers and configured to permit fluid communication between the two chambers during a portion of the piston's movement and which prevents fluid communication between the two chambers after the piston has moved by a given distance.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A suspension fork for a two wheeled vehicle having a fork leg comprising:
   a. a gas spring housing which includes an inner telescoping hollow rod and an outer telescoping hollow rod, wherein the inner telescoping hollow rod is partially and movably inserted into the outer telescoping rod, the inner telescoping hollow rod includes an elongated circular wall having a top end which is air tightly sealed by an air top cap and a bottom end which is air tightly sealed by an air bottom cap, the outer telescoping hollow rod includes an elongated circular wall having a top end which is slidably connected to the inner telescoping rod and a bottom end with a central bore;
   b. a volume control member which is placed inside of the inner upper telescoping rod and is connected to the air top cap and having an elongated hollow shaft which is connected to a lower stationary piston which is air tightly affixed to the inside of the inner upper telescoping rod;
   c. an elastic volume compensator made of compressible foam material, which is connected to the lower stationary piston of the volume control member, comprising an elongated cylinder having a top end and bottom end;
   d. a reciprocating piston including a top end, bottom end and circular side wall, wherein the piston is movably and air tightly contacted to the inner side of the inner upper telescoping rod;
   e. a first expandable and contractible chamber filled with air and which is positioned between the volume compensator and the reciprocating piston, comprising a stationary chamber end and a changeable chamber end which is connected to the piston, wherein the changeable chamber end is changed along with the reciprocating movement of the piston;
   f. a second expandable and contractible chamber filled with air and which is positioned between the reciprocating piston and the bottom end of the inner upper telescoping rod, comprising a stationary chamber end and a changeable chamber end which is connected to the piston, wherein the changeable chamber end is changed along with the reciprocating movement of the piston;
   g. an air bypass channel, comprising an elongated slot having a top end and a bottom end, which is longitudinally positioned on the inner surface of the inner upper telescoping rod, the air bypass channel is connected between the first and second expandable and contractible chambers only when the second expandable and contractible chamber is in a contracting process to thereby cause the top end of the piston that is movably positioned to be lower than the top end of the elongated slot, and the air bypass channel is disconnected between the first and second expandable and contractible chambers only when the first expandable and contractible chamber is in a contracting process to thereby cause the top end of the piston that is movably positioned to be higher than the top end of the elongated slot;

h. a piston connecting hollow rod connected to the piston, which extends to penetrate through the air bottom cap and connect to the central bore at the bottom end of the outer lower telescoping rod; and i. a gas valve, which is installed at the bottom end of the outer lower telescoping rod to connect to the piston connecting rod.

* * * * *